United States Patent [19]

Toda et al.

[11] Patent Number: 4,558,356
[45] Date of Patent: Dec. 10, 1985

[54] COLOR PRINTER

[75] Inventors: Katsuhiko Toda, Yokohama; Susumu Sugiura, Yamato, both of Japan

[73] Assignee: Canon Kabushiki Kaisha, Tokyo, Japan

[21] Appl. No.: 411,972

[22] Filed: Aug. 26, 1982

[30] Foreign Application Priority Data

Sep. 1, 1981 [JP] Japan .................................. 56-136111

[51] Int. Cl.$^4$ ............................................. H04N 1/46
[52] U.S. Cl. ......................................... 358/75; 358/80
[58] Field of Search .................................. 358/75–80; 355/32

[56] References Cited

U.S. PATENT DOCUMENTS

| | | | |
|---|---|---|---|
| 4,007,489 | 2/1977 | Helmberger | 358/75 |
| 4,096,519 | 6/1978 | Hoffrichter | 358/80 |
| 4,346,402 | 8/1982 | Pugsley | 358/80 |
| 4,349,835 | 9/1982 | Horiguchi | 358/80 |

Primary Examiner—Michael A. Masinick
Attorney, Agent, or Firm—Fitzpatrick, Cella, Harper & Scinto

[57] ABSTRACT

A color printer has a color decomposing unit for decomposing an image signal into a plurality of color signals, processing unit for image-processing the color signals, a recording unit for recording images on a plurality of recording media in accordance with the image-processed color signals and a control unit for controlling transfer timings of the images formed on the recording media to a print paper in registration to each other.

18 Claims, 11 Drawing Figures

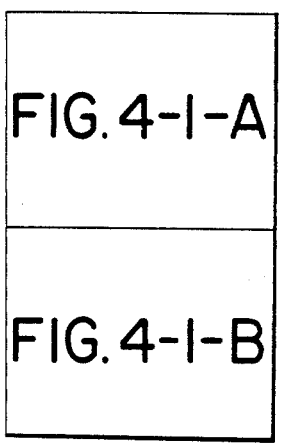
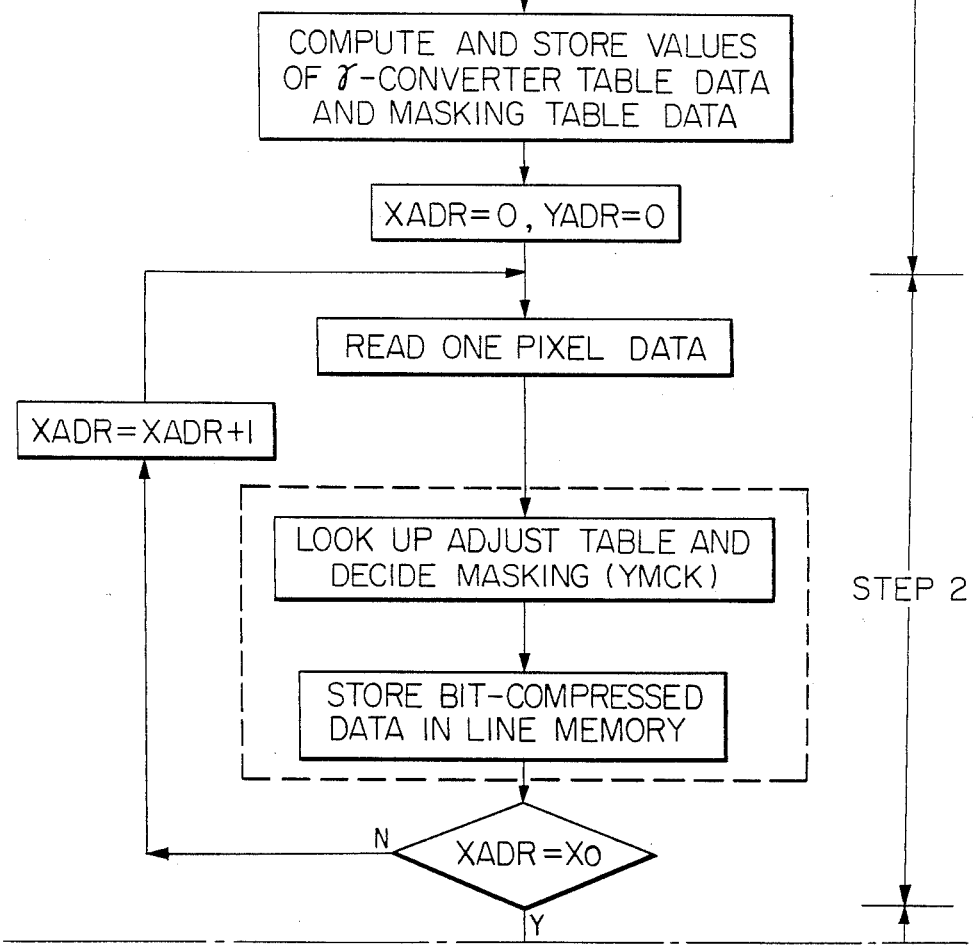
FIG. 4-1-A

FIG. 4-I-B
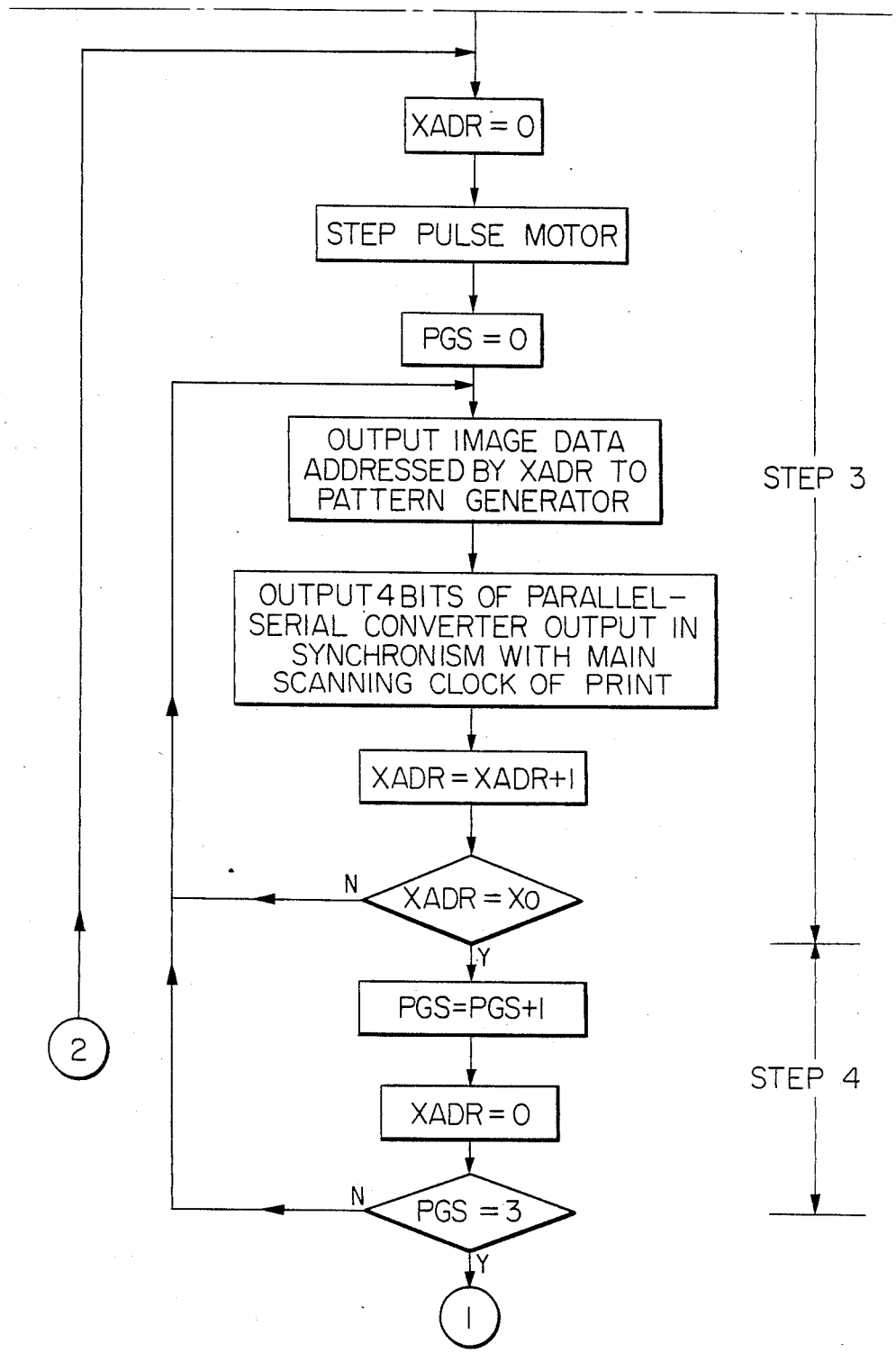

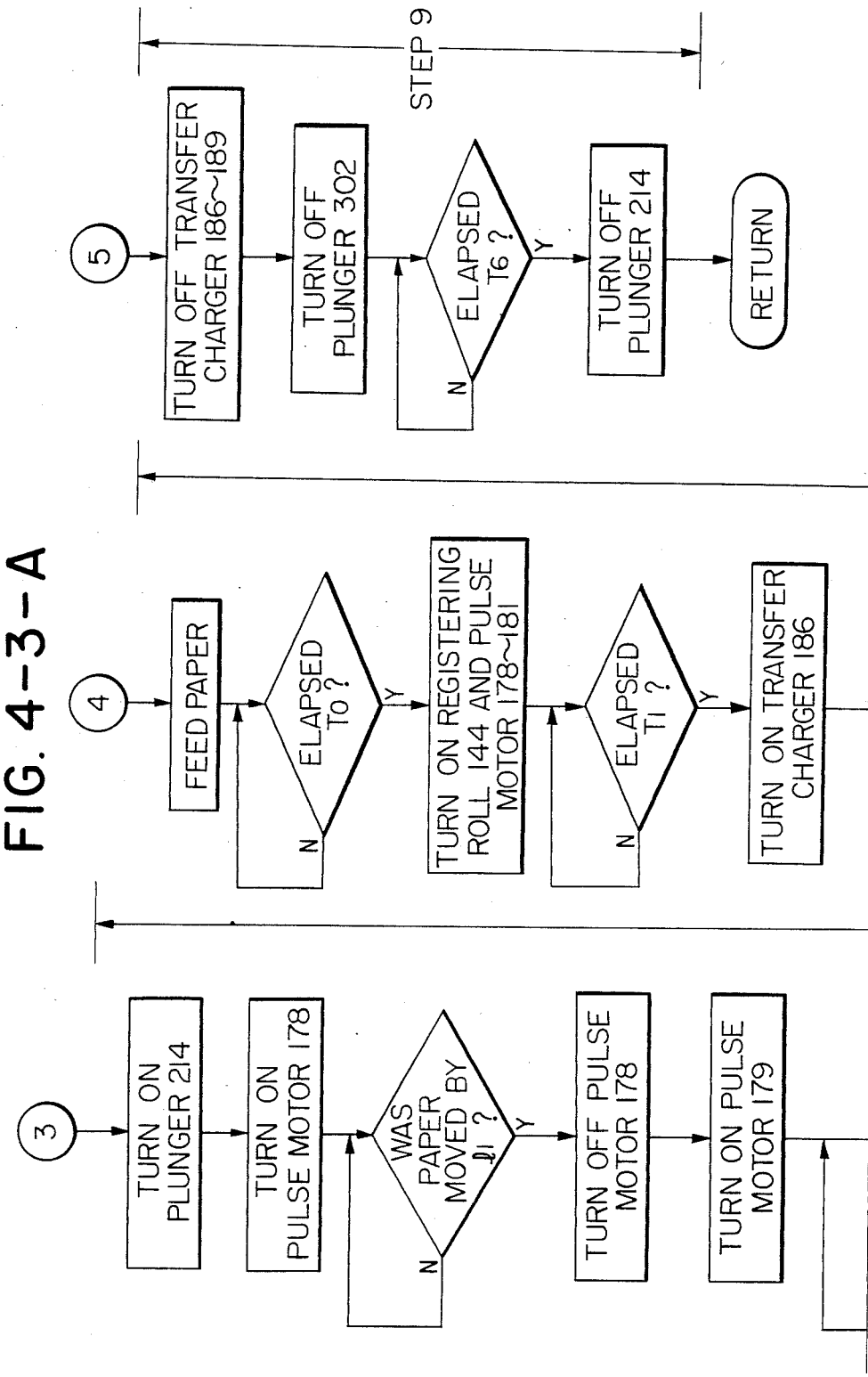
FIG. 4-3-A

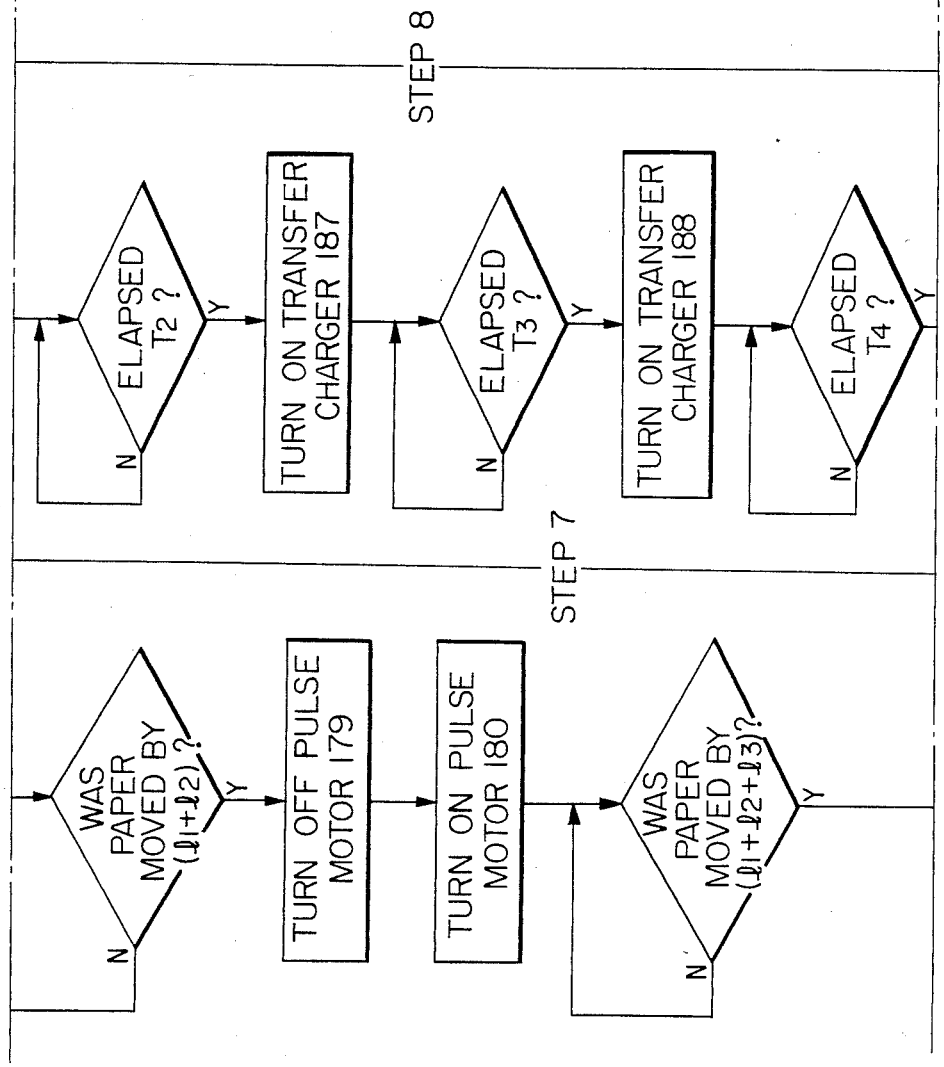

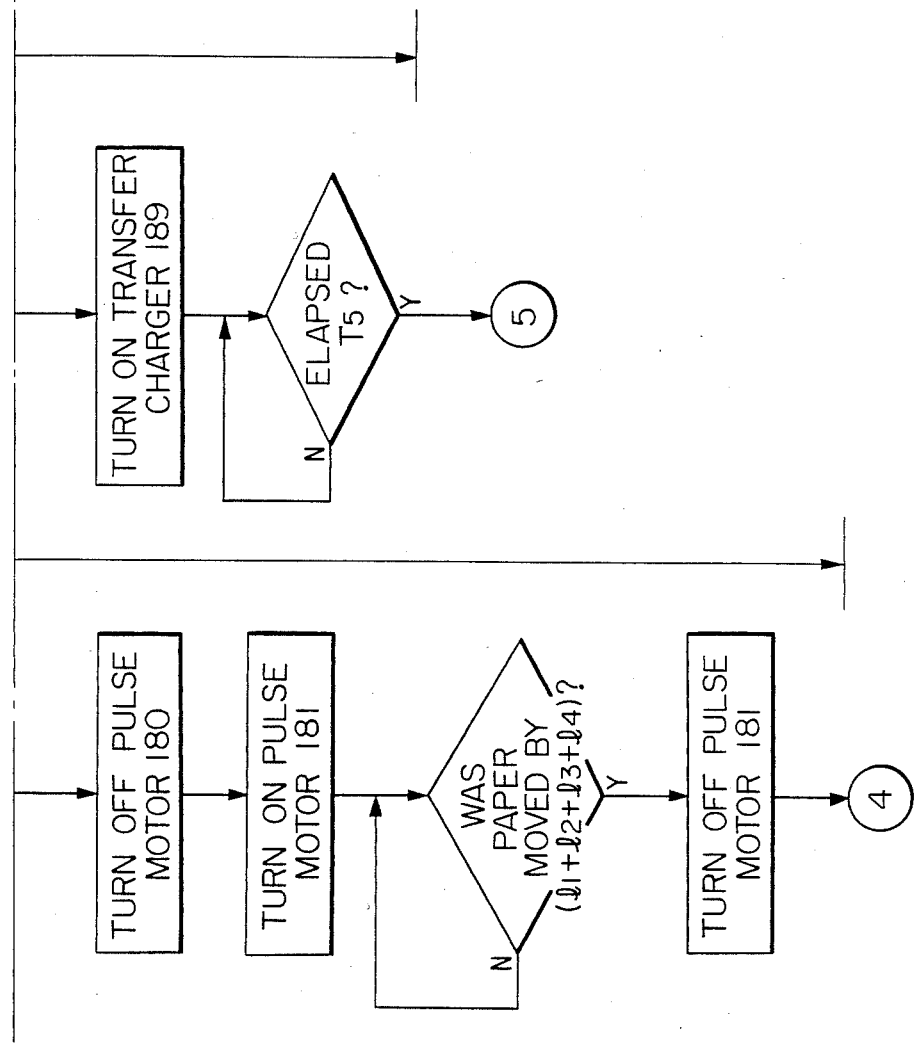

COLOR PRINTER

BACKGROUND OF THE INVENTION

1. Field of the Invention

The present invention relates to a color printer which color-decomposes an original image and forms a color image on a recording medium in accordance with the color-decomposed image signals.

2. Description of the Prior Art

Prior art electrographic color printers use several systems, such as those described below.

In one system, an original image is sequentially color-decomposed to three colors, latent images are formed one for each of the color-decomposing filters, the latent images are developed by complementary color developers and the developed images of different colors are superimposed to reproduce a color image.

This system can attain fast reproduction and is inexpensive but improvement of the quality of the image is limited because the system cannot attain $\gamma$-correction, multi-tone reproduction and monochromatic image reproduction.

In another system, three-color-decomposed image data are stored in a frame memory, the contents of the memory are sequentially read after image processing, a laser beam, for example, is used as an electrographic recording light source and it is modulated by the image signals, latent images are formed and they are developed by complementary color developers and the developed images are superimposed to reproduce a color image.

In this system, because of the image processing, the quality of graphic image is improved over the first system but the system is very expensive because of the large capacity of the frame memory. For example, assuming that an original image on a size A/4 sheet is to be stored with a picture cell size of 0.15 mm square, the memory capacity needed for four colors is (210 mm×297 mm)/(0.15 mm×0.15 mm)×4 (sheets)×8 (bits)=88,704,400 bits. Assuming that the cost per bit in future is 0.01, it costs about 890,000. This is the cost for only the memory elements, and when an assembly and adjustment cost and the printed circuit board cost are added, the total cost will be approximately 1,000,000, which is very expensive.

However, in the prior art system, such a frame memory is essential for other reasons than the image processing as described below.

(A) When multi-color superposition printing is effected with a single photosensitive drum, the four color image-processed data must have been stored in the frame memory before the printing starts, because the recording station has only one-color memory and hence the three-color decomposed image data of the input image and the monochromatic data must be stored in the frame memory.

(B) In a system having a plurality of, for example, four photosensitive drums and four recording stations, recording start positions on the photosensitive drums are adjusted when the images are transferred to a print paper in order to register the positions of the respective color images. Thus, the frame memory is necessary to adjust the recording start positions for the respective color photosensitive drums.

SUMMARY OF THE INVENTION

It is an object of the present invention to provide a color printer which is inexpensive, carries out the image processing at a high speed and produces a high quality of image.

It is another object of the present invention to provide a color printer which decomposes an original image into a plurality of color signals and carries out the image processing in real time.

It is a further object of the present invention to provide a color printer which color-decomposes an original image, image-processes the color-decomposed signals, records the processed signals on a plurality of recording media, adjusts the positioning among the respective recording media and transfers the images on print paper.

The above and other objects of the present invention will be apparent from the following description of the preferred embodiments of the present invention.

DETAILED DESCRIPTION OF THE PREFERRED EMBODIMENTS

Figure 1C:
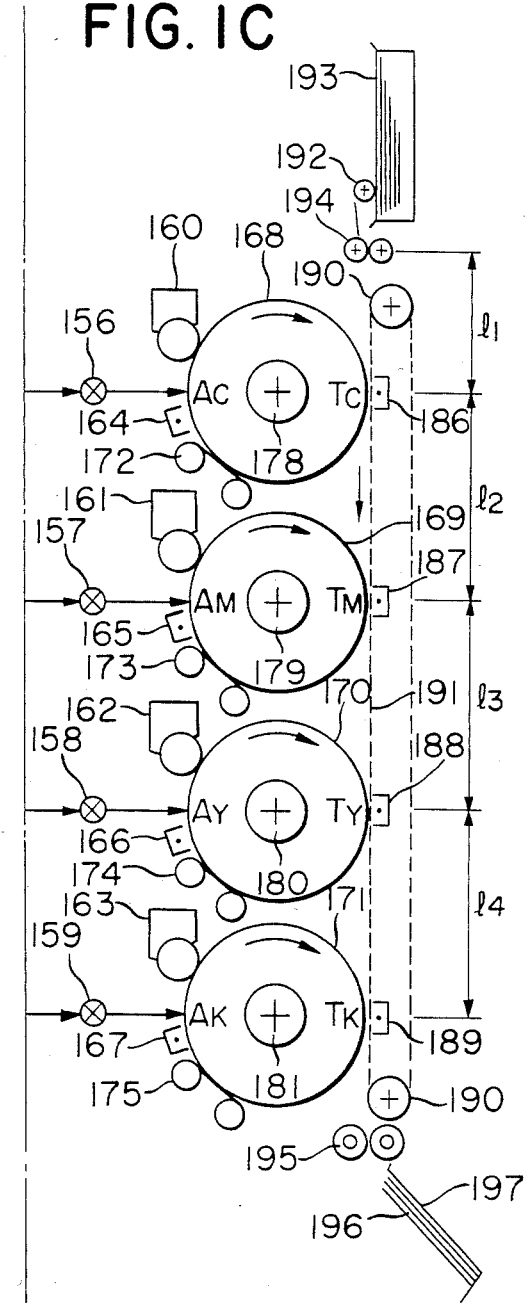
FIGS. 1A, 1B and 1C show a block diagram of an example of the overall configuration of the present invention.
Figure 1:
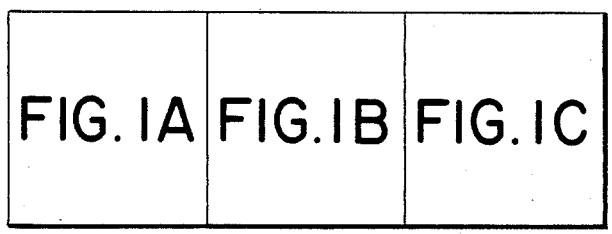
Figure 1A:
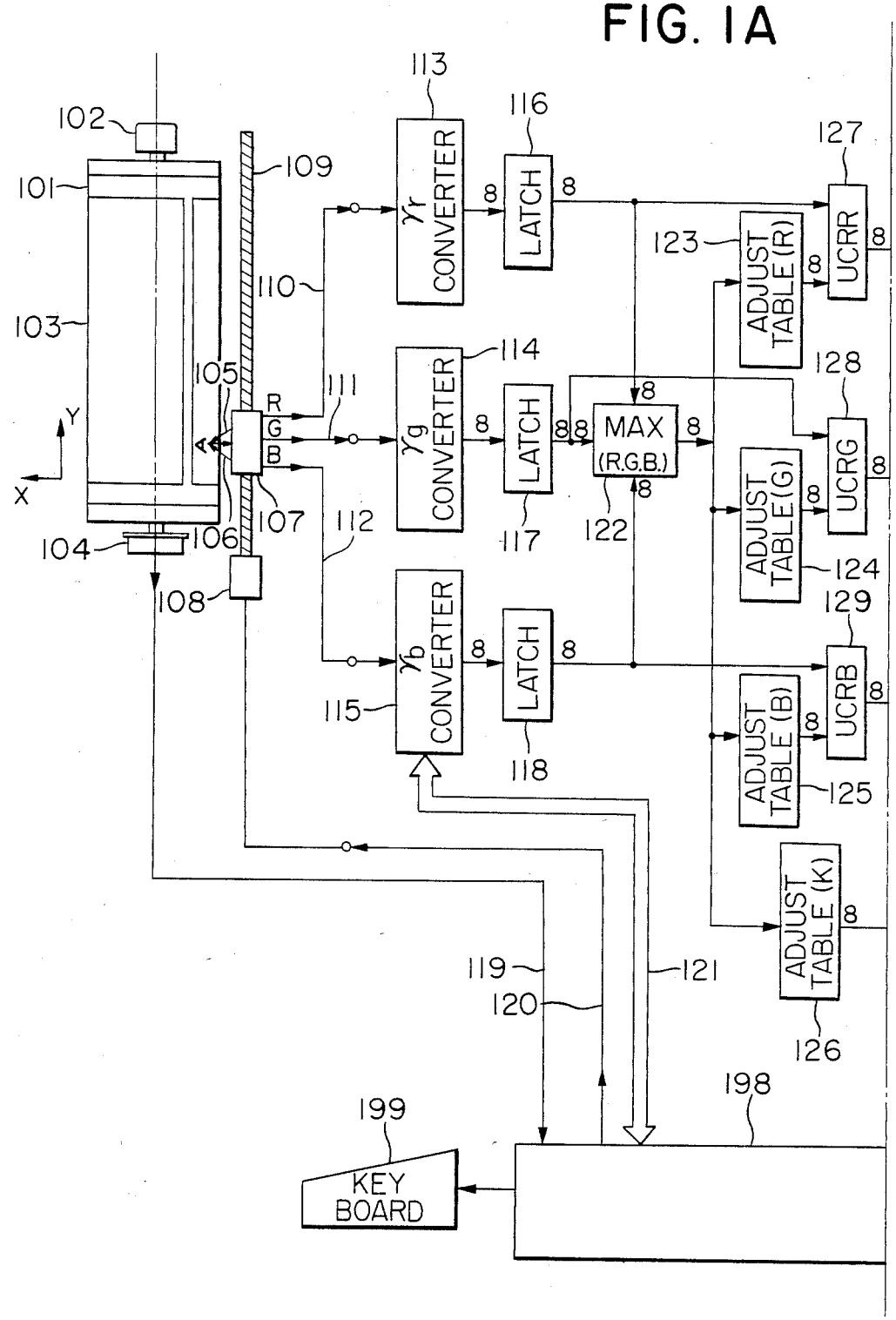
Figure 1B:
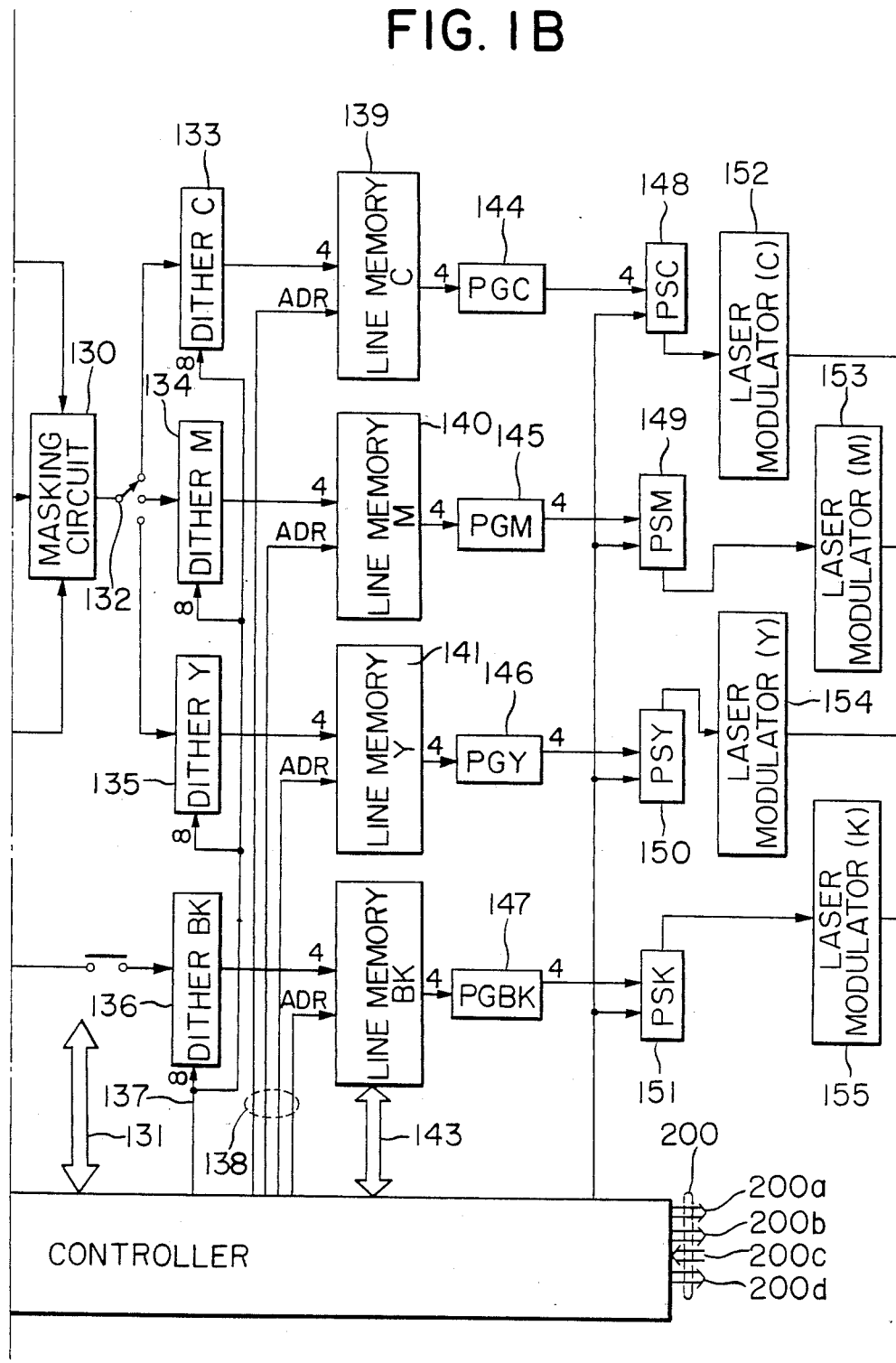

FIG. 1 shows a block diagram of one embodiment of the present invention, which comprises, in major blocks, an input unit 101–112, a real-time image processing unit 113–151, a four-color recording unit 152–197 including four photosensitive drums, four semiconductor laser devices and four scanners, and a controller 198 for controlling those units. The controller 198 comprises well-known CPU, ROM and RAM.

Details of the respective units are now explained.

The input unit is first explained. Numeral 101 denotes an original drum which is a recording medium and is rotated by a motor 102 at a constant rotational speed. An original 103 is wrapped around a surface of the drum 101. Numeral 104 denotes a pulse encoder. One point on the original 103, for example a point A having a picture cell area of 0.15 mm square is illuminated by an incandescent light source 105, 106 and reflected light therefrom is directed to an optical system and color decomposing filters arranged in an original read head 107 to decompose the light into blue (B), green (G) and red (R) electrical signals 110–112. The original read head 107 is driven in a sub-scan direction by a lead screw 109 which is rotated by a pulse motor 108. The B, G and R electrical signals 110–112 are digitized by analog-to-digital converters which produces 8-bit digital signals which are in turn supplied to $\gamma$-converters 113–115 in the image processing unit where the reflection energy signals from the original are converted to original density signals. The input signal data 110–112 are used as addresses so that the $\gamma$converters 113–115 produce intermemory data having the input signal data 110–112 as the addresses. In this manner, the $\gamma$-conversion is effected in real time by table look-up.

The outputs of the γ-converters 113–115 are supplied to data latches 116–118. Since the data from the data lines 110–112 are read in a time division fashion, the number of lines between the read head 107 and the γ-converters 113–115 can be reduced. In order to calculate monochromatic quantity data in a monochromatic quantity determination circuit 122, three color signals are simultaneously required. To this end, output data latches 116–118 are provided. Unless wiring difficulty is encountered, the signals may be processed in parallel to eliminate the need for the data latches 116–118. The monochromatic quantity determination circuit 122 determines the monochromatic quantity by selecting a maximum of the three color (R, G, B) image density signals. Basically, it is processed by means of determining the maximum by a digital comparator. The output from the monochromatic quantity determination circuit 122 is supplied to monochromatic quantity adjustment tables 123–126 where the monochromatic quantity is adjusted based on the data processed in the monochromatic quantity determination circuit 122. Again, it is processed in real time by the table look-up. The outputs of the monochromatic quantity adjustment tables 123–125 and the outputs of the data latches 116–118 are supplied to background color removal circuits (UCRR, UCRG, UCRB) 127–129, where differences between the original image density values and the monochromatic quantity are calculated and color components excluding brightness components are calculated, and are then supplied to a masking circuit 130. The masking circuit 130 serves as a complementary color conversion circuit for converting the decomposed color signals to complementary color signals and also serves as a circuit for compensating for the spectrocharacteristics of the toner used. Again, it is processed in real time by table look-up. The output of the masking circuit 130 is supplied to dither circuits 133–135 through a switch 132 and the output of the monochromatic quantity adjustment table 126 is supplied to a dither circuit 136.

The dither circuits 133–136 produce intermediate tone (gray level) representations of the images. In a system in which an intermediate tone is digitally represented by the number of dots per unit area, the limit of a dot diameter in a non-silver salt system, for example, is approximately 50 μm. Thus, assuming that the resolution power is 7 lines/mm, 17 intermediate tones are represented by 4×4 dots.

As seen from the above, the intermediate tone ability of the basic picture cells is governed by the dot size and the resolution power in the recording unit. When the basic picture cells comprise 4×4 dots to represent 17 intermediate tones, the information quantity of the reproduced image is very small relative to the 8 bits of the input intermediate tone information and this results in the degradation of the image quality.

The visual faculty of human beings does not require the intermediate tones where the resolution power is high and requires the intermediate tones where an area is made. Accordingly, the 4-bit output of the dither is added to the four low order bits of the input data to scatter the density pattern at random in a relatively large area in order to increase the apparent number of intermediate tones. As a result, pseudo-outlines are also prevented.

The outputs of the dither circuits 133–136 are supplied to line memories 139–142, respectively. Since the line memories 139–142 each represent one picture cell by a 4×4 matrix, it is necessary to scan the output four times for each read-in in the input. Thus, the line memories 139–142 are used as buffer memories therefor.

The dithered 4-bit data are supplied to pattern generators (PGC, PGM, PGY, PGBK) 144–147, which select basic density patterns corresponding to the respective 4-bit input data. The pattern generators 144–147 each has a 2-bit input data line PGS by which a line data of the 4×4 matrix is selected.

The outputs of the pattern generators 144–147 are supplied to parallel-to-serial signal converters (PSC, PSM, PSY, PSK) 148–151 which convert the 4 bit parallel signals from the pattern generators 144–147 to serial signals. The serial image signals after imageprocessed in real time are simultaneously applied to recording laser modulators 152–155, which are scanned axially of photosensitive drums 168–171 through scanner and optical systems 156–159.

The photosensitive drums 168–171 are pre-charged by chargers 164–167 and latent images are formed thereon by laser beams from the laser modulators 152–155. As the photosensitive drums 168–171 are rotated, the latent image bearing areas thereof are brought under developing units 160–163 where they are visualized by respective color developers. The respective color images are recorded simultaneously and parallelly.

The developed and visualized images on the photosensitive drums 168–171 pass under cleaners 172–175 which are now in retracted position. Thus, the recording of one revolution of image or one sheet of image is completed. The developing units are moved away so that they do not contact the photosensitive drums.

The photosensitive drums 168–171 may be driven by 5-phase pulse motors 178–181, respectively. The 5-phase pulse motor has a standard rotational angle of 0.72 degree/pulse. On the other hand, in order for a full image of a size A4 original to be formed on the photosensitive drums 168–171, they need a size of approximately 70 mm in diameter and approximately 300 mm in length. Assuming that a pulse motor gear ratio necessary to print with a dot of 50 μm in diameter, $500X = (70 = \pi = \sqrt{2})/0.05 = 12.44$. Thus, a reduction gear having a reduction ratio of 1/12 is used to drive the photosensitive drums 168–171.

On the other hand, assuming that the process speed is 60 mm/sec, the drive frequency P of the pulse motor is expressed by $(60 = \sqrt{2})/0.05 = P/12$ and hence P×20,364 pps. The highest response frequency of the 5-phase pulse motor is on the order of 20,000–130,000 pps. Thus, a conventional pulse motor can respond to such frequency.

It should be understood that slow-up and slow-down controls are carried out at the start and the stop of the photosensitive drum to prevent missyn chronization.

In this manner, one line of the original image is decomposed into three color signals, which are processed in real time, and the resulting data are stored in the line buffers, the contents of which are sequentially read to modulate the latent image forming semiconductor lasers to form the latent images, and the images of size A4 are developed on the respective color photosensitive drums by the respective color toners.

Under this condition, the recording start points are at $A_K$, $A_Y$, $A_M$ and $A_C$ shown in FIG. 1. If the photosensitive drums 168–171 are rotated at a constant rotational speed from those start points, the images are not transfered in registration on a record paper 193. When transfer points of the photosensitive drums 168–171 are designated by $T_M$, $T_Y$ and $T_K$ and distances between the adjacent transfer points of the drums are designated by $l_2$–$l_4$ and a distance from a timing roll 194 to the first transfer point $T_C$ is designated by $l_1$, it is necessary to shift the start point $A_C$ for the photosensitive drum 168 closest to a paper feed station by the distance $l_1$ counterclockwise from the transfer point $T_C$ along the circumference of the drum and shift the start point $A_M$ for the photosensitive drum 169 by the distance $l_1+l_2$ counterclockwise along the circumference of the drum from the transfer point $T_M$. For the photosensitive drums 170 and 171, it is necessary to shift the start points $A_Y$ and $A_K$ by the distances $l_1+l_2+l_3$ and $l_1+l_2+l_3+l_4$, respectively, counterclockwise along the circumferences of the drums from the transfer points $T_Y$ and $T_K$, respectively.

The positioning control for the photosensitive drums is effected while the developing units 160–163, the cleaners 172–175 and the transfer chargers 186–189 are isolated. Since the positioning control is done by the pulse motors 178–181, the pulse motors are stepped by the specified numbers of pulses by the controller 198 in an open loop to register the drum positions so that the points $A_C$–$A_K$ are shifted counterclockwise by the distances described above.

After the images on the respective photosensitive drums have been registered at the start points $A_C$–$A_K$, the drum rotational speeds are raised to a predetermined process speed by the slow-up control while the print paper 193 is fed by a paper feed roll 192 to form a loop in a space between the paper feed roll 192 and a timing roll 194, where the record paper stands by. The paper feed is then started by the timing roll 194 in timed relation with the photosensitive drums 168–171 to transfer the images on the record paper so that a four-color superimposed image is reproduced.

The record paper having the color images reproduced thereon is fixed by a fixer 195 and ejected to a paper ejection tray 197 as a reproduced paper 196.

Numerals 186–189 denote the transfer chargers which are controlled by the controller 198 in timed relation with the record paper.

A belt 196 for conveying the record paper may be driven by a 5-phase pulse motor similar to the pulse motors 178–181 such that a speed of the belt matches the peripheral speed of the photosensitive drums. Numeral 190 denotes a gripper which is an auxiliary means for positively conveying the record paper.

Figure 2:
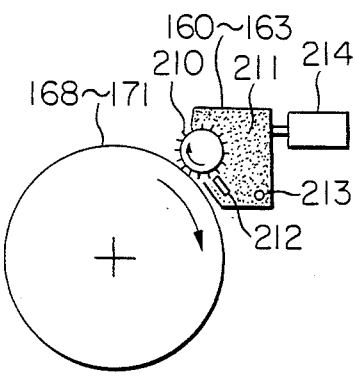
FIG. 2 shows a side view of a separation mechanism of a developing unit.
Figure 3:
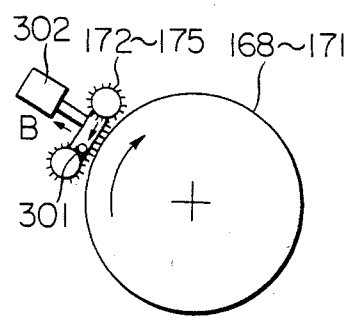
FIG. 3 shows a side view of a separation mechanism of a cleaner, and FIGS. 4-1-A, 4-1-B, 4-2, 4-3-A, 4-3-B, and 4-3-C show control flow charts in accordance with the present invention.

The ON-OFF controls of the developing units 160–163 and the cleaners 172–175 are effected in the manners shown in FIGS. 2 and 3.

FIG. 2 shows a control mechanism of the developing unit. Numeral 210 denotes a developing roll. Developer 211 and a blade 212 for regulating the height of developer chain are accomodated in a respective casing for each of the developing units 160–163. Each of the developing units 160–163 is pivotable around a pivot axis 213 by a plunger 214 which is selectively actuated and deactuated to contact the chain of the developer 211 deposited on the developing roll 210 to the photosensitive drum and move it away from the photosensitive drum.

FIG. 3 shows an example of the control mechanism of the cleaner. The cleaners 172–175 are of web cleaning type and each has a pivotal axis 301 and is pivoted by actuating and deactuating a plunger 302 mounted on the main frame. When the plunger 302 is driven in a direction of arrow B the cleaner is moved away from the photosensitive drum 168–171 and when it is driven in the opposite direction the cleaner contacts the photosensitive drum to clean it.

In this manner, the ON-OFF controls of the developing units and the cleaners are effected.

In FIG. 1, numerals 121, 131 and 143 denote address and data lines to access memory areas, numeral 199 denotes an input device including a keyboard, numeral 200 denote input/output lines external to the controller, numeral 200a denotes a control output line for the pulse motors 178–181, numeral 200b denotes a control output line for the cleaners 172–175 to turn ON and OFF the plungers of the cleaners, numeral 200c denotes an input line from the rotary encoder which generates pulse signals as the pulse motors 178–181 rotate, and numeral 200d denotes a drive output line to drive the paper feed roll and the transfer chargers.

Figures 2, 4:
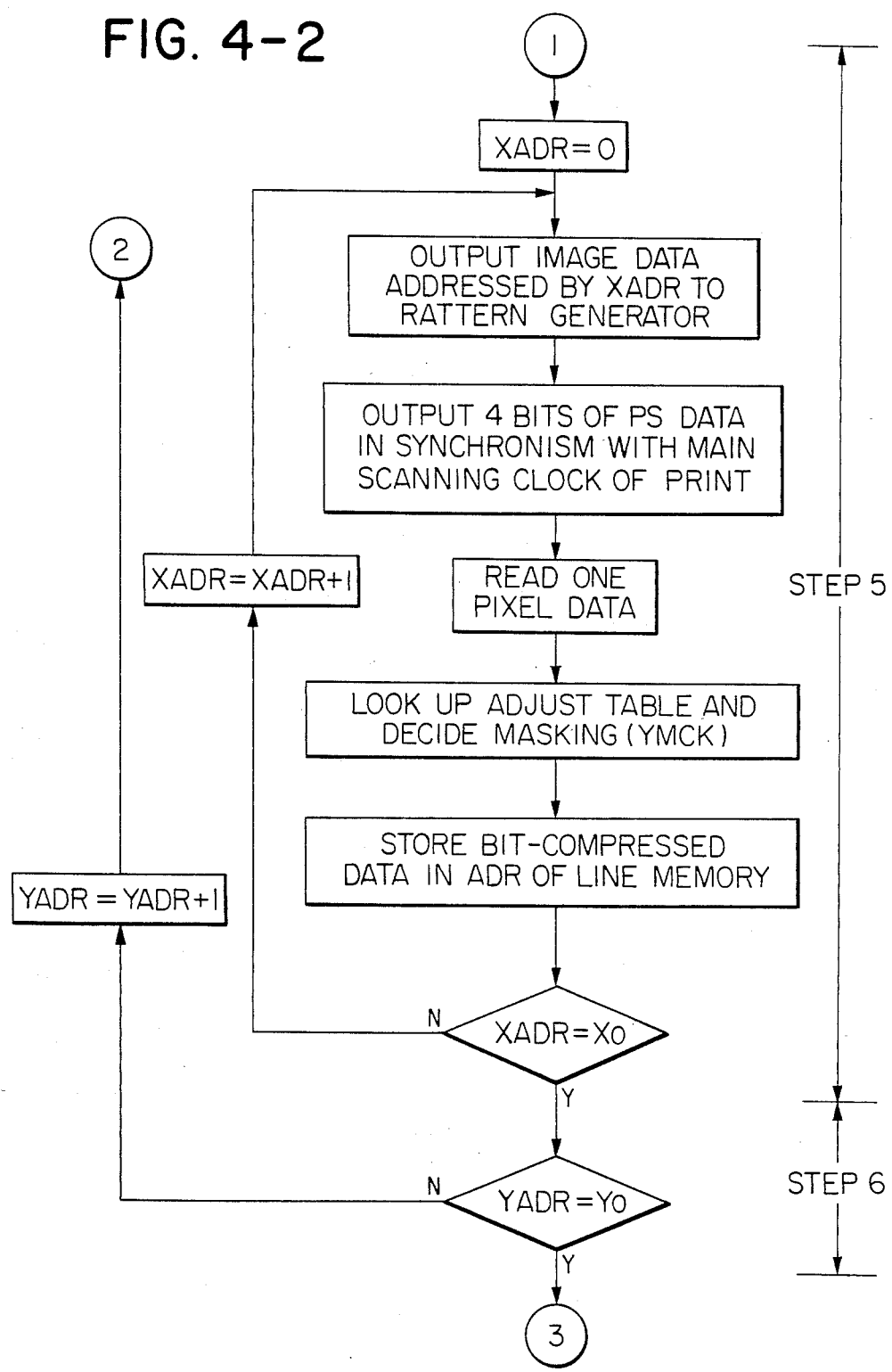

FIGS. 4-1 through 4-3 show flow charts of the control operations of the color printer of the present invention. The present invention is further explained with reference to the flow charts.

In step 1, the plungers 302 of the cleaners 172–175 are actuated by the output 200b from the controller 198 to separate the cleaners 172–175 for the photosensitive drums 168–171 from the photosensitive drums 168–171. The table data of the $\gamma$-converters 113–115 and the table data of the masking circuit 130 are calculated based on constants of the $\gamma$-converters and a masking constant entered from the keyboard 199, and they are stored in the memory areas. The table data are then set in the adjustment tables 123–125. The X and Y addresses of the read unit are set to "0".

In step 2, one X-line of picture cell data are read. The read head 107 reads one picture cell data at the addresses XADR=0 and YADR=0, which are converted to the B, G and R electrical signals and the image processing including the $\gamma$-conversion, masking, monochromatic image formation and background color removal is effected. The signals are then bit-compressed by the dither circuits 133–136 and the compacted data are stored in the line memories 139–142. The above picture cell read operation is repeated until the number of picture cells $X_0$ on the entire periphery of the original drum is reached.

In step 3, the first line of output image for the first line of input picture cells is written. The address XADR is set to "0" and the pulse motor 108 is energized to move the read head 107 in the Y-direction so that the address YADR is changed to "1". The output on the signal line PSG is set to "0". The image data at the address XADR is supplied to the pattern generators 144–147. Of the 4×4 matrix data, the row data specified by the 2-bit signal PGS is supplied to the parallel-to-serial signal converters 148–151. The 4-bit data is read in synchronism with the clock supplied from the controller 198. The laser beams are modulated with the data by the laser modulators 152–155 and recorded on the photosensitive drums in the direction of main scan. The address XADR is then incremented by one and the image data are read from the line memories 139–142 by the address XADR and they are supplied to the pattern generators 144–147. Then, the images are recorded on the photosensitive drums 168–171 in the same manner as described above. When the first line of image has been recorded the third line of output image is written in step 4. The output of PSG is incremented by one and the address XADR is set to "0" and the second line of image is written in the same manner as the step 3. When the third line of image has been written, the process goes to step 5 where the second and subsequent lines of input picture element data are read and the fourth line of output image is written.

The address XADR is set to "0" and the fourth line of output image is written. The second line of input picture cell data is read and image-processed in the same manner as described above. The above operation is repeated until the address XADR reaches $X_0$. In this manner, the fourth line of image data is written, that is, the image data for the first line of input picture cells read by the read head 107 is written and the second line of input picture cells are read.

In step 6, the third and subsequent lines of input picture cells are read and the fifth and subsequent lines of output image data are written. It is checked if the address YADR is equal to the number of picture cells $Y_0$ in the sub-scan direction of the input original, and if the decision is No, the current address YADR is incremented by one and the process goes to step 3 where the input picture cells are read and the output image data are written in the same manner as described above. When the address YADR reaches $Y_0$, the process goes to step 7.

In step 7, the positioning of the photosensitive drums 168-171 are effected in preparation to the transfer to the print paper 193. The plungers 214 are actuated by the output 200b from the controller 198 to separate the developing units from the photosensitive drums. Then, the pulse motor 178 is energized to rotate counterclockwise by the output 200a from the controller 198. The pulse signals generated by the rotary encoder as the pulse motor 178 rotates and supplied to the input 200c of the controller 198 are counted. When the pulse count corresponding to the distance $l_1$ is reached, the pulse motor 178 is deenergized. Similarly, the pulse motors 179-181 are energized and when the pulse counts corresponding to the distances $l_1+l_2$, $l_1+l_2+l_3$ and $l_1+l_2+l_3+l_4$ are reached, the pulse motors 179-181, respectively, are deenergized.

In step 8, the print paper 193 is fed so that the toner images formed on the photosensitive drums 178-181 are transferred to the print paper 193. The paper feed roll 192 is first driven. After a time $T_0$, the register roll 144 is driven and the pulse motors 178-181 are energized to rotate clockwise. After a time $T_1$, the transfer charger 186 is energized so that the image formed on the photosensitive drum 168 is transferred to the print paper 193. The time $T_1$ corresponds to the time required for the leading edge of the print paper 193 to move from the registration point to the transfer point $T_C$, that is, the time required for the print paper 193 to move by the distance $l_1$. After a time $T_2$, the transfer charger 187 is energized so that the image formed on the photosensitive drum 169 is transferred to the print paper 193. The time $T_2$ corresponds to the time required for the transfer paper 193 to move from the registration point to the transfer point $T_M$, that is, the time required for the print paper 193 to move by the distance $l_1+l_2$. Similarly, after times $T_3$ and $T_4$, the transfer chargers 188 and 189, respectively, are energized so that the images formed on the photosensitive drums 170 and 171 are transferred to the print paper 193. The times $T_3$ and $T_4$ correspond to the times required for the print paper 193 to move from the registration points to the transfer points $T_Y$ and $T_K$, respectively, that is, the time required for the transfer paper 193 to move by the distances $l_1+l_2+l_3$ and $l_1+l_2+l_3+l_4$, respectively. The paper feed roll 192 is stopped at a predetermined timing. After a time $T_5$, that is, when the trailing edge of the print paper 193 has passed the transfer point $T_K$ and the transfer operation has been completed, the process goes to step 9. The time $T_5$ corresponds to the time required for the trailing edge of the print paper 193 to pass through the transfer point $T_K$. The paper feed roll 192 and the registration roll are stopped at the predetermined timings.

In step 9, the transfer chargers are deenergized. The plunger 302 is deactuated to bring the cleaners 172-175 into contact with the photosensitive drums 168-171, respectively, to clean the surfaces of the photosensitive drums 168-171 for a time $T_6$. Then, the plungers 214 are deactuated to return the developing units 160-163 to the original positions.

In the present embodiment, four photosensitive drums 168-171 are used to simultaneously write the images on the four drums for one read cycle of the original. Alternatively, a single drum may be used. In this case, the drum is scanned four times and the simultaneous three-color deposition is effected for each scan.

While the pulse motors are used to drive the photosensitive drums in the above embodiment, the same effect is obtainable by a 4-drum drive motor and powder clatches. While the Carlson process is explained in the above embodiment, the same effect is obtainable by the NP process. In this case, after one revolution of latent image has been formed, the development and the transfer are simultaneously carried out.

As described hereinabove, according to the present invention, no frame memory for storing one original of image data is needed and hence an inexpensive color printer is provided.

What we claim is:

1. A color printer comprising:
 means for generating four color image signals;
 recording means for recording images corresponding to the respective color image signals at respective different areas of a recording medium at substantially the same time;
 means for transferring the images formed on the recording medium onto printing paper; and
 means for controlling transfer timings for the respective images.

2. A color printer according to claim 1, wherein said recording means forms images corresponding to the respective color image signals on four different recording media.

3. A color printer according to claim 2, wherein said recording media comprise four rotary cylinder drums.

4. A color printer according to claim 3, wherein said transfer means includes a respective transfer mechanism for each of said drums, for transferring onto recording paper at a respective transfer position.

5. A color printer according to claim 4, wherein said control means controls the transfer timing for each of said transfer mechanisms.

6. A color printer according to claim 5, wherein said control means rotates a predetermined number of said drums in a reverse direction with respect to the image forming rotation as a function of the distance between the respective said transfer positions.

7. A color printer according to claim 5, wherein said recording means includes means for forming latent images corresponding to the respective color image signals and developer for developing the latent images.

8. A color printer according to claim 7, wherein said control means include means for separating said developer from said recording media when said drums rotate in the reverse direction.

9. Image forming apparatus comprising:
   means for generating a color density signal representative of a recording density for each of cyan, magenta, yellow and black;
   pattern signal generating means for providing a pattern signal for each color in response to the color density signals;
   means for forming a latent image for each color on a recording substrate by making use of the pattern signal for each color;
   means for developing the latent image for each color; and
   means for transferring the images on the recording substrate onto recording paper.

10. Image forming apparatus according to claim 9, wherein said recording substrate is photosensitive and said latent image forming means includes means for optically scanning said photosensitive recording substrate.

11. Image forming apparatus according to claim 10, wherein said optical scanning means comprises a laser oscillator and optical scanning mirror.

12. Image forming apparatus according to claim 9, wherein said pattern signal generating means includes dithering means for applying a dither signal to the color density signal.

13. Image forming apparatus comprising:
   means for generating a digital density signal representative of a recording density for each of plural colors, the digital density signals for a plurality of scanning positions adjacent to one another being generated at substantially the same time;
   a parallel-serial convertor for converting the digital density signals into a serial signal wherein the digital density signals are time-sequentially arranged for the respective scanning positions;
   means for forming a latent image for each color on a recording substrate by making use of the serial signal;
   means for developing said latent image for each color; and
   means for transferring the image on the recording substrate onto recording paper.

14. Image forming apparatus according to claim 13, wherein said recording substrate is photosensitive and said latent image forming means includes means for optically scanning said photosensitive recording substrate.

15. Image forming apparatus according to claim 14, wherein said optical scanning means comprises a laser oscillator and optical scanning mirror.

16. Image forming apparatus comprising:
   table conversion means for obtaining a plurality of output color signal values by addressing a plurality of input color signal values;
   means for temporarily storing at least one line of the output color signal for each color;
   means for forming a latent image for each color on a recording substrate by the outputs from said temporary storage means;
   means for developing the latent image for each color; and
   means for transferring the image on the recording substrate.

17. Image forming apparatus according to claim 16, wherein said recording substrate is photosensitive and said latent image forming means includes means for optically scanning said photosensitive recording substrate.

18. Image forming apparatus according to claim 17, wherein said optical scanning means comprises a laser oscillator and optical scanning mirror.

* * * * *

UNITED STATES PATENT AND TRADEMARK OFFICE
CERTIFICATE OF CORRECTION

PATENT NO. : 4,558,356
DATED : December 10, 1985
INVENTOR(S) : KATSUHIKO TODA, ET AL.

It is certified that error appears in the above-identified patent and that said Letters Patent is hereby corrected as shown below:

IN THE DRAWINGS:

FIG. 4-2, change "RATTERN GENERATOR" to --PATTERN GENERATOR--.

IN THE SPECIFICATION:

Column 1, line 44, before "0.01" insert -- ¥ -- and before "890,000" insert -- ¥ --; and
line 48, before "1,000,000" insert -- ¥ --.

Column 2, line 65, change " $\gamma$ converters" to -- $\gamma$-converters--.

Column 3, line 16, change "by a" to --by means of a--.

Column 4, line 13, change "imageproc-" to -- image-proc- --;
line 42, change "(70=$\pi$=$\sqrt{2}$)" to --(70x$\pi$ x $\sqrt{2}$)--;
line 47, change "(60=$\sqrt{2}$)" to --(60x $\sqrt{2}$)--;
line 48, change "Px20,364 pps." to --P=20,364 pps.--;
line 54, change "missyn chronization." to --missynchronization.--; and
line 67, change "fered" to --ferred--.

Column 5, line 55, change "accomodated" to --accommodated--.

UNITED STATES PATENT AND TRADEMARK OFFICE
CERTIFICATE OF CORRECTION

PATENT NO. : 4,558,356

DATED : December 10, 1985

INVENTOR(S) : KATSUHIKO TODA, ET AL.

It is certified that error appears in the above-identified patent and that said Letters Patent is hereby corrected as shown below:

Column 6, line 9, change "200 denote" to --200 denotes--;

line 33, change "are" to --is--; and
line 39, change "bit-compresed" to --bit-compressed--.

Column 8, lines 24-25, change "powder clatches." to --power clutches.--.

Signed and Sealed this

Sixteenth Day of September 1986

[SEAL]

Attest:

DONALD J. QUIGG

Attesting Officer

Commissioner of Patents and Trademarks